July 23, 1946.  C. H. M. ROBERTS  2,404,405
METHOD FOR REMOVING IMPURITIES FROM MINERAL OILS
Filed Dec. 16, 1939
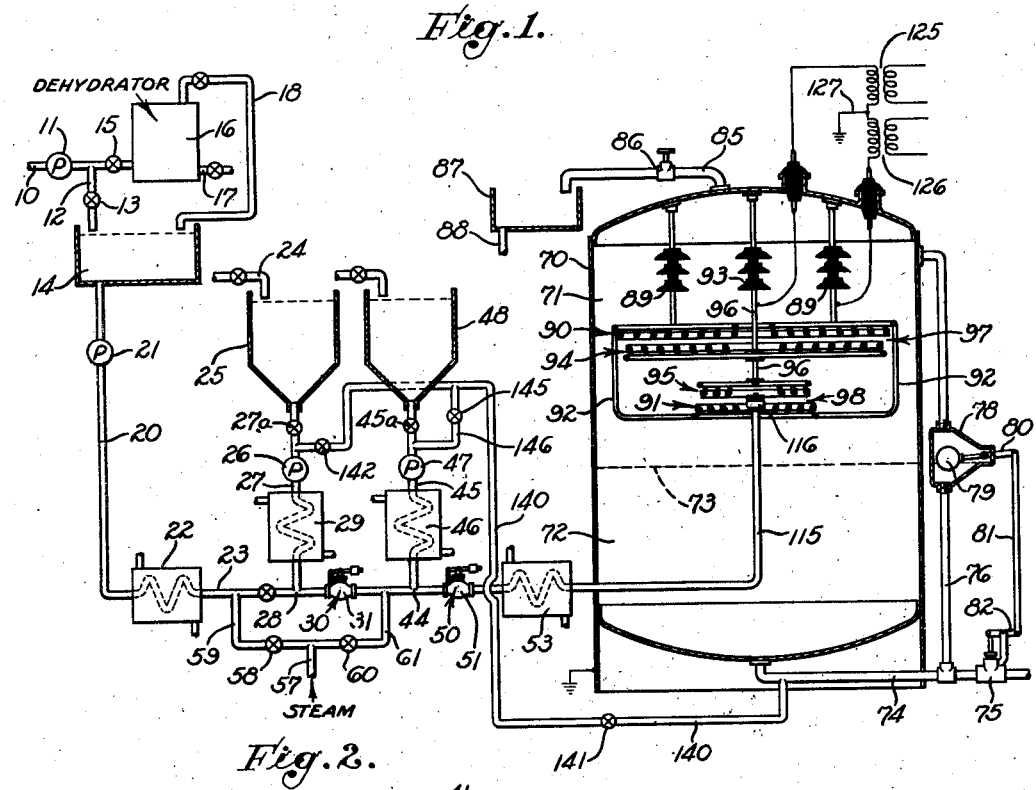
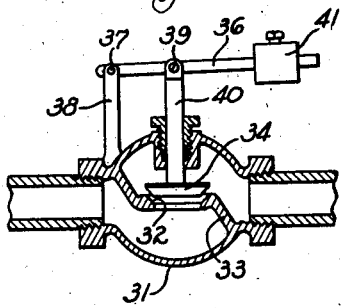
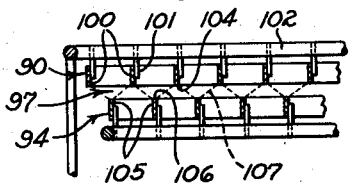
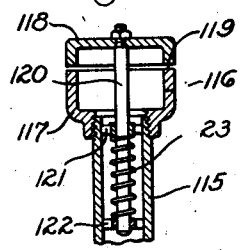
INVENTOR
CLAUDIUS H. M. ROBERTS
BY HARRIS, KIECH, FOSTER & HARRIS
ATTORNEYS.

Patented July 23, 1946

2,404,405

UNITED STATES PATENT OFFICE 2,404,405

METHOD FOR REMOVING IMPURITIES FROM MINERAL OILS

Claudius H. M. Roberts, Palos Verdes Estates, Calif., assignor to Petrolite Corporation, Ltd., Wilmington, Del., a corporation of Delaware Application December 16, 1939, Serial No. 309,590

4 Claims. (Cl. 204—190)

My invention relates to the purification of oils and, more particularly, to a method and apparatus for removing water-dispersible impurities from oil, for example, removing saline material and other impurities from a mineral oil, though the process is also applicable to various other oils to remove impurities capable of being taken up by the addition of water.

It is not uncommon to find oils containing water-soluble or water-wettable impurities and, most frequently, these are present in the oil in the form of, or associated with, small liquid droplets or solid particles dispersed or emulsified throughout the oil, though in some instances they may be in solution in the oil, as in the case of certain inorganic acids which are soluble both in oil and water. Such impurities are herein termed as "water-dispersible impurities," by which term I have reference to impurities which may be dispersed in water, either to produce a homogeneous solution (as in the case of water-soluble impurities which are miscible with or soluble in the water and which, when dissolved in water, may be regarded as molecularly or ionically dispersed therein), or to produce a water-continuous dispersion including the impurity as the internal phase (as in the case of water-wettable, water-insoluble impurities).

The removal of water-soluble or water-wettable impurities from such oils is a problem which is frequently encountered and which is of particular importance in the handling of petroleum oils, crude or topped, containing saline material such as dispersed salt or oil-field brine, and also in the removal of reagents and reaction products in refinery distillates. The dispersed, and frequently very highly stabilized, condition of the impurities makes it difficult or impossible to accomplish the desired purification by ordinary non-electrical methods.

According to the present process, such impurities are removed by forming, in a novel manner, an artificial dispersion or emulsion which is oil-continuous and which includes dispersed water droplets of different sizes or added under different conditions, this dispersion being treated electrically to coalesce the water which, when separated, is found to contain most of the water-dispersible impurities, and it is an object of the present invention to provide a novel method operating in this manner.

It is another object of the invention to introduce the added water into the system at a plurality of points, dispersing the water into the oil in a manner well suited to produce an emulsion or dispersion capable of continuous electric treatment. By this mode of operation, it is possible to secure a desired heterogeneity of particle size of the added water, or to add the water in increments at different sequential positions to obtain the desired electrically-treatable dispersion.

If an attempt is made to add the entire amount of water at a single position, followed by a mixing step adapted to disperse the water into the oil, it will be found in most instances that a definitely limited mixing action must be used if the process is to be capable of continuously resolving the emulsion or dispersion into oil and water, without the accumulation of such amount of sludge as would interfere with the maintenance of the electric field. On the other hand, it is desirable in many instances to have present in the dispersion droplets of added water which are quite small in size, often commensurate in size with the dispersed impurities which are sometimes present in a size of about 1 mu. If the entire amount of water is added at a single position, it is sometimes found that an electrically-untreatable emulsion or dispersion results if sufficient mixing action is applied to insure that some of the added water is dispersed in particles of such small size. Likewise, while some degree of heterogeneity of particle size of the added water can be obtained by an appropriate single-mixing step, the range of particle sizes is sometimes considerably below that which is most desirable in the process. On some oils, the range of particle size appears quite small if such single-step mixing action is used as will remove the desired proportion of the impurities.

When all of the water is thus dispersed into the oil through the use of a mixing step produced by flow through a restricted orifice, a more or less heterogeneous particle size distribution may be obtained, in which the particles vary from small to large with a single predominant size, the size-frequency distribution following the well-known probability curve with a single maximum at some intermediate size depending upon the adjustment of the dispersing means. When the water is added in two increments, the first to produce particles of smaller average size than are produced in the second mixing stage, the characteristic particle size distribution curve is secured for each increment, while the final resultant dispersion contains particles showing two distinct maxima in the size-frequency distribution curve, corresponding to the adjustment of the two dispersing means. This procedure permits the introduction of water particles commensurate in size with those of the impurities in the oil in any desired ratio to those of the larger sizes, thereby permitting great flexibility in adjustment of the treatability of the final dispersion, together with ability to obtain an increased degree of removal of the highly dispersed impurities; whereas, when using a single dispersing step, it may be possible to secure enough particles of the desired small size only at the expense of obtaining too low a concentration of particles of the desired larger sizes, thereby leading to difficulties in the subsequent electrical resolution due to formation of sludge.

It is an object of the present invention to produce an electrically-treatable dispersion of desired heterogeneity as to the size of dispersed water droplets therein.

It is another object of the present invention to add water to the system at two or more points separated by one or more mixing zones in which a controlled mixing action is applied.

Another object of the present invention is to disperse a portion of the added water into the oil in the form of relatively small droplets, and to disperse another portion of the added water into the oil at a later time, the later-added water being present in the form of droplets which are of an average size larger than those produced in the first dispersing process.

Further objects and advantages of the invention will be made evident hereinafter to those skilled in the art.

The process is particularly adapted to the purification of oils prior to subsequent refining steps, for example subjection to distillation or cracking temperatures. It is capable of taking out, and particularly applicable to the removal of, impurities which, upon heating to refining or cracking temperatures, comprise or form acids or other materials having a tendency to corrode or form deposits in the subsequent refining equipment, or having a tendency to deleteriously affect the quality of the final products. Purification by the present process makes possible long, trouble-free runs on such subsequent equipment, and the process can well be operated to be maintained on-stream with this subsequent refining equipment with no appreciable loss of oil. On the other hand, the process is not limited to the treatment of oils preparatory to further refining.

The oil with which the present invention is concerned can be any oil having sufficient resistivity to sustain an electric field at coalescing potential when this oil is present in whole or in part as the continuous phase of an emulsion or dispersion in which the added water is dispersed in accordance with the invention. Petroleum oils are particularly well adapted for treatment by the process, whether in a crude state or whether resulting from previous refining steps. In the latter connection, the process can be used on topped oils or on various fractions obtained from oils.

Such oils can be dry, or substantially dry, or can contain dispersed water with which at least some of the impurities may be associated, this water being dispersed in the oil to form what is hereinafter termed "original water droplets." The process is not well adapted to oils of high water content, for example, oils containing from 20% to 50% of water (percentages here and elsewhere are by volume), and such oils are preferably first dehydrated to produce the starting material for the present purification process. The preferred oils are those which contain no more than a small amount of water, usually under about 8% and only very infrequently as high as 10–15%. Best purification results are obtained by starting with an oil containing no more than a few per cent of water, for example, an oil containing from a fraction of 1% up to 5–8%, and I have a decided preference for oils in the lower portion of this range if a high percentage of the impurities is to be removed.

The water which I disperse sequentially into the oil preparatory to electric treatment should be relatively fresh, by which term I have reference to water capable of taking up, or becoming associated with, the water-dispersible impurities to be removed. This relatively fresh water need not be distilled water and need not be entirely devoid of the impurities to be removed or other chemicals or minerals, and, in fact, the process is improved on certain oils by the presence of small amounts of chemicals, as disclosed in certain copending applications, for example Nees, et al., Serial No. 312,745, now Patent No. 2,380,458. It is imperative, however, that if the incoming oil contains dispersed impurity-containing droplets, the added relatively fresh water should contain these impurities, if at all, in concentrations materially lower than the originally-present droplets, and if the oil contains no such original droplets, the relatively fresh water should have a concentration, if any, in the impurities to be removed which is very low.

In effect, the process adds droplets of relatively fresh water to the oil in controlled dispersing steps so that the electric field can coalesce the dispersed water and exert a powerful action moving the impurities into the relatively fresh water. Following separation of the coalesced water, the oil will usually still contain certain dispersed water droplets present in amount not more than a few per cent, and preferably less than 2%, but such dispersed water will correspond predominantly to the added relatively fresh water, and the water content is made low enough so as not to be objectionable in subsequent refining steps, if used. The necessity for use of a relatively fresh water will be readily apparent from an example assuming the presence of 1% of brine in the incoming oil and the presence of 1% of water in the oil resulting after separation of the coalesced water. If this incoming oil contained 100 pounds of salts per 1000 barrels of oil, these salts being, for instance, predominantly magnesium and calcium chloride, and if the added water is of the same concentration in these impurities as are the original water droplets, then the separated oil will contain these salts in amount about 100 pounds per 1000 barrels, and the total reduction in the impurities will be negligible. On the other hand, when operating with a relatively fresh water under the same circumstances, reductions in salt content of more than 90% can be readily obtained.

The electric field utilized in the process should be capable of bringing into combination or association the impurities and the droplets of relatively fresh water, and should, likewise, be capable of coalescing the water into masses of sufficient size to be readily separable from the oil. The coalescing fields herein-used are usually of the high-voltage alternating current type, though coalescing fields formed by the use of direct current can, in some instances, be substituted, though the process is not concerned with low-voltage fields exerting only a cataphoretic action.

The process can best be described with reference to the treatment of mineral oils containing water-dispersible impurities, and the process hereinafter described will be exemplified in this manner, without intention of limitation.

Likewise, appropriate apparatus will be shown as exemplary, and in the accompanying drawing:

Figure 1 illustrates diagrammatically one embodiment of the apparatus capable of carrying out the process;

Figure 2 is an enlarged view in vertical section of one type of mixing means useful in the process;

Figure 3 is an enlarged sectional view of a portion of the electrode structure shown in Figure 1; and Figure 4 is an enlarged sectional view of the distributing means shown in the electric treater of Figure 1.

Referring particularly to Figure 1, the oil to be treated may be moved through pipe 10 by a pump 11. If this oil is already of low water content, it can be discharged through pipe 12 and valve 13 into a tank 14. If the water content of the oil is high, it is preferable first to dehydrate the oil by electrical, chemical, centrifugal, or other means, or merely by settling. This can be accomplished by opening a valve 15 so that the incoming oil moves to a dehydrator 16 from which the excess water can be withdrawn through a pipe 17, and the oil of low water content through the pipe 18 for delivery to the tank 14.

The oil to be purified is withdrawn from the tank 14 through a pipe 20 by the action of a pump 21, which usually supplies sufficient pressure to move the oil through the system while maintaining superatmospheric pressure on the oil until it discharges from the electric treater. If desired, the oil flowing in the pipe 20 may be heated by passage through a heat exchanger 22 and then flow along a pipe 23.

Any suitable means can be used for dispersing relatively fresh water into this oil in two or more positions, the dispersing steps being such as to facilitate the operation of the process, as hereinbefore described. In the exemplary showing of Figure 1, the relatively fresh water is added in two stages, and dispersion is effected by flow through mixing valves. For example, the first portion of the relatively fresh water may be supplied through a pipe 24 to a tank 25 and, from this tank, proportioned into the oil stream by use of a pump 26, moving the water through pipe 27 and valve 27a into the oil stream in the pipe 23 at right angles at the junction 28. If desired, this portion of the relatively fresh water can be heated in a heat-exchange means 29.

Injection of this portion of the added water into the oil stream mixes the water with the oil and forms a preliminary dispersion at the junction 28. However, in most instances, it is desirable further to mix these constituents and this can be done by use of a suitable mixing means 30 disposed in the pipe 23 beyond the junction 28. This mixing means is preferably of the once-through type and may well induce the desired mixing action by the turbulence attendant upon change in direction of flow or passage through a restricted orifice. One readily-controllable type of mixing means is shown in Figures 1 and 2 as comprising a weight-loaded valve 31 providing a seat 32 in a partition 33. A valve member 34 is vertically movable toward and away from the seat 32 by use of an arm 36 pivoted at 37 to a post 38, and pivoted at 39 to a plunger 40 connected to the valve member. The arm 36 carries an adjustable weight 41 so that the mixing action may be adjusted by moving the weight 41.

The dispersion thus formed is shown as moving along the pipe 23 to a junction 44 under the action of the pumps 21 and 26. Here, the second portion of relatively fresh water is injected through a pipe 45 after being suitably heated, if desired, in a heat exchanger 46. This relatively fresh water is moved into the pipe 45 through a valve 45a therein by a pump 47 intaking from a second tank 48. In some instances, a simple injection of the second portion of water into the oil stream will mix the two and give a desired type of dispersion containing, for example, small droplets of relatively fresh water as dispersed into the oil by the first mixing or dispersing step, and larger droplets of relatively fresh water dispersed into the stream by the injecting action adjacent the junction 44. However, in many instances, it is desirable to mix the constituents further and a mixing means 50 can be used in this connection. This mixing means is shown as comprising a weight-loaded valve 51 similar to that previously described. The resulting dispersion is delivered to the electric treater but, if desired, can be additionally heated or cooled by use of a heat exchanger 53.

A valuable adjunct to the process and apparatus thus far described, and which can be used in place of or to supplement the dispersion of the first portion of the relatively fresh water in the oil, is the addition of steam to assist in the formation of the desired dispersion. If steam is moved into the pipe 23 in proportioned amount, this steam will be dispersed throughout the oil stream and will almost instantaneously condense. Depending upon the manner of injection of the steam, particles of relatively fresh water of different size can be thus dispersed, the relatively fresh water in this instance comprising the condensate. Usually, such dispersed droplets formed by the injection of steam are quite small in size, and this is often desirable in the process.

As shown in Figure 1, steam from any suitable source may be moved through a pipe 57 and, upon opening of a valve 58, will be delivered to the pipe 23 through a pipe 59. Alternatively, or at the same time, upon opening a valve 60, the steam may be delivered in proportioned amount to the pipe 23 through a pipe 61. Correspondingly, steam may be delivered either prior to or after dispersing the first portion of relatively fresh water into the oil through the pipe 27. Often, such injection of steam can be used to eliminate the addition of relatively fresh water through the pipe 27, relying upon the later addition through the pipe 45 to supply the somewhat larger droplets of relatively fresh water which are desirably present in the dispersion undergoing electric treatment.

While various electric treaters can be used in the process, Figures 1 and 3 show an embodiment which has been found to be very satisfactory and which is claimed in the application of Harold C. Eddy, Serial No. 218,681, now Patent No. 2,277,513. This treater is preferably, though not necessarily, of the type in which electric treatment and separation take place in the same tank. Such a tank is indicated by the numeral 70, and after operation for a period of time, contains bodies of oil and water 71 and 72, shown as separating at the surface or interface 73.

In view of the electrical system utilized, it is desirable to maintain this surface or interface 73 at or about the position shown, and to accomplish this, the rate of withdrawal of treated constituents from the tank 70 may be varied. The system shown includes a water draw-off pipe 74 equipped with a valve 75. Extending upward from the pipe 74, and thus communicating with the water in the lower part of the tank 70, is a pipe 76, this pipe terminating at its upper end with the body of oil 71 and being provided at a position near the interfacial zone with a chamber 78.

An oil-water interface will thus form in this chamber and any suitable means can be used to control the withdrawal from the tank 70 to maintain the interface 73 substantially constant in position. A float 79 is shown in this connection and is mounted on a pivoted arm 80, which is connected by link 81, with a link 82 forming a part of the operating system for the valve 75. The float 79 is of such character as to sink in oil and float in water. Correspondingly, when the interface rises, the float moves upward and, through links 81 and 82, the valve 75 is opened sufficiently to increase the flow therethrough, thus tending to lower the interface 73 until the float returns the valve 75 to its previous position. The amount of treated oil moving from the upper portion of the tank 70 through a pipe 85 may similarly be varied by adjustment of a valve 86 therein.

This purified oil may be moved to subsequent refining equipment, either with or without additional settling time, but is shown as discharging into a tank 87 from which any water separating from the oil can be withdrawn through a pipe 88, the oil being pumped from this tank to suitable refining equipment for distillation, cracking, or other processing, if desired. The valves 75 and 86 act to maintain at all times sufficient superatmospheric pressure in the tank 70 to prevent such vaporization of the lighter fractions of the oil as might interfere with satisfactory separation.

The electrode system of this treater is disposed in an oil environment of sufficient resistivity as to permit maintenance of the electric field under given operating conditions. In this connection, I prefer to use a live electrode structure suspended from insulators 89, and shown as including an upper live electrode 90 and a lower live electrode 91 suspended therefrom and electrically connected thereto by rods 92. Suspended from an insulator 93 and positioned between the upper and lower live electrodes 90 and 91 is an intermediate live electrode structure, shown as including electrodes 94 and 95 joined by a conducting rod 96. These electrodes cooperate respectively with the electrodes 90 and 91 in providing upper and lower treating spaces 97 and 98.

The electrodes 90, 91, 94, and 95 are preferably of interstitial character, and the constructional details of the embodiment shown will be clear by reference to Figures 1 and 3. Referring to Figure 3, the electrode 90 may include a plurality of concentric rings 100 mounted on pins 101 secured to cross arms 102. Each ring provides a lower annular edge 104 adjacent which the electric field is very concentrated. The electrode 94 is similarly formed, with a plurality of concentric rings 105 terminating in upward-extending annular edges 106. By disaligning the rings 100 and 105, the most intense portion of any electric field established in the treating space 97 will be inclined as indicated by the dotted lines 107. The electrodes 91 and 95 are similarly formed and are preferably of smaller diameter than the electrodes 90 and 94.

This type of electrode structure presents a minimum impedance to gravitational separation in the tank 70, the rings and supporting means therefor covering only a small fraction of the total cross-sectional area of the tank 70. Furthermore, the interstitial character of these electrodes permits free communication between the electric fields and facilitates rapid removal of coalesced water masses therefrom.

The incoming dispersion or emulsion is preferably delivered from the heat exchanger 53 through a pipe 115 directly into the lower treating space 98. It is preferred to move the dispersion radially outward in this field so that it moves successively through the edge-to-edge fields and sets up desirable circulations into the treating space 98 from the zone thereabove and from the zone therebeneath, thereby permitting recycling of some of the treated constituents through the electric field. Such radial discharge may be effected through use of a distributor 116, best shown in Figure 4 as including a housing 117 attached to the pipe 115 and provided with a cap 118 which may be permanently or adjustably spaced therefrom to provide an annular passage 119 through which the dispersion is delivered to the lower treating space 98. A spring-loaded distributor can be used in this connection (of the type shown in Figure 4) and can be made to exert a mixing action on the incoming constituents at the point of discharge into the field, this being often desirable though not essential to the operation of the process. For example, the cap 118 may carry a rod 120 slidable in a spider 121 and carrying a passaged spacer element 122. By disposing a compression spring 123 between the spider 121 and the spacer element 122, the cap 118 will be moved resiliently downward and will be displaced upward a distance determined by the rate of input of the dispersion.

Various means may be utilized for energizing the electrodes to establish suitable electric fields in the treating spaces 97 and 98. In the construction shown, all of the electrodes 90, 91, 94, and 95 are maintained above ground potential, the only grounded portions adjacent the electrodes being the distributor 116, the tank 70, and the body of water 72. By proper design of the electrical system, the potential between the intermediate electrode structure and the electrodes 90 and 91 can be made much higher than the potential between any of the live electrodes and the grounded portions of the system. In Figure 1, such a system is shown as including two transformers 125 and 126 providing secondary windings connected in additive relation. One terminal of each secondary winding is grounded as indicated by the numeral 127, and the remaining terminals are respectively connected to the intermediate electrode structure and to the upper and lower live electrodes 90 and 91. Suitable switches and control means for limiting the current may be used in the primary circuits of these transformers.

Assuming, for example, that each transformer develops a potential of 12,000 volts, the potential across the upper treating space 97 will be 24,000 volts, as will also the potential across the lower treating space 98. However, the potential between the distributor 116 and the electrodes 91 or 95 will be only 12,000 volts, as will be the field-inducing potential between the lower electrode 91 and the body of water 72, and which field is often desirable in further treating the settling water masses, as well as in sludge elimination. Use of such a system tends to prevent short-circuiting to the distributor and also permits introduction of the dispersion directly into a field of high voltage. It will be apparent that by using different electrode spacings and/or different potentials, the voltage gradients in the spaces 97 and 98 and the intensities of the treating actions therein may be controlled as desired to produce the best treating effects on the oil being processed.

The preferred mode of operation is one in which the dispersing steps are so controlled as to produce a dispersion which is continuously resolvable with the aid of an electric field into oil and water, without the accumulation of such amount of sludge as would interfere with the maintenance of the electric field. This resolution can be effected by coalescing treatment in the electric field, aided, if desired, by recycling through the electric field as mentioned above, followed by settling or other separating steps. If the dispersing steps are properly controlled, resolution into oil and water can be obtained, the water being substantially free of oil, within commercial tolerances, but now containing the impurities extracted from the oil, either in their original or somewhat modified state. Such a mode of operation will prevent the accumulation of such amount of sludge, comprising unresolved emulsion, as would interfere with the maintenance of the electric field.

If the incoming oil contains suspended impurities, these are often of very small size. It has been found desirable to have some of the relatively fresh water droplets of a commensurate or only slightly larger size as this appears to increase the total percentage reduction of impurities. If the relatively fresh water is added at a single point, followed by such mixing as will produce particles of this small size, it is found on many oils that sludge difficulties are encountered, as evidenced either by the inability to maintain coalescing potentials across the electrodes during continuous operation, or by the progressive accumulation of a layer of sludge in the interfacial zone which eventually may build up either to short-circuit the eelctrodes or to gradually pervade the bodies of oil and water, thus preventing the continuous withdrawal from the treater of substantially oil-free water and oil of suitably low water content.

By the present invention, I can add a portion of the relatively fresh water at one stage of the process and control the dispersing action to produce such small droplets of relatively fresh water, and can add another portion of the relatively fresh water at another stage of the process and control the dispersing action to produce droplets of relatively fresh water of an average size larger than those produced in the first stage. In this manner, I can control very definitely the proportion of small droplets and the proportion of larger droplets, and, if desired, can produce a dispersion containing water droplets differing in size very materially and of a homogeneity range considerably different and larger than is possible in other processes. This has been found very desirable and conducive to a higher percentage removal of impurities, as well as making possible the continuous treatment of oils at high throughput rates with substantially complete resolution while still obtaining the desired reduction in impurities.

I prefer to disperse the smaller droplets in the oil prior to the dispersion of the larger droplets in the system shown, but the opposite sequence can be used without departing from the spirit of the invention. The smaller droplets can be formed either exclusively by the mixing means 30 or by the injection of steam, as previously described, or these actions can be used together. If steam is introduced through the pipe 59 to supply the small droplets, the relatively fresh water added through the pipe 27 can be dispersed into the oil to form droplets of an average size somewhat larger, and the relatively fresh water added through the pipe 45 can be dispersed in such manner that the average size of the resulting droplets is even larger, thus making possible a wide range of particle size.

I usually find it desirable to add at least the last portion of the relatively fresh water to the oil at a position quite close to the electric field, and, in most instances, it is desirable to add the first portion immediately ahead of the second portion. However, if desired, the first portion can be added to the oil a considerable time prior to the addition of the later portion without departing from the spirit of the invention.

One very desirable mode of operation in purifying an oil containing dispersed impurities is to avoid predominant combination of these dispersed impurities with the relatively fresh water until the dispersion enters the electric field. This insures that droplets of the relatively fresh water will be present in the dispersion to be acted upon by the field to bring them into association or combination with the dispersed impurities.

The amount of relatively fresh water used in the process will vary with different oils and with the desired degree of purification. The water content of the dispersion entering the electric field should not be so high as to produce inverse phase emulsions of the oil-in-water type in such amount as cannot be handled by the electric field. The upper limit on most oils appears to be below 40% or 50%. Usually, the water content of the dispersion is considerably less and may commonly range between 8% and 30%. If the incoming oil contains no water, or contains no more than 2% or 3% of water, the total amount of relatively fresh water added will usually be found within the range of 5% to 20% to bring the total water content of the dispersion to at least about 8%, and the most desirable percentage can be determined empirically. Likewise, the relative amounts of water added at the different stages of the process will vary with different oils and no fixed values can be given. In some instances, the proportions added through the pipes 27 and 45 can be commensurate with each other but, in other instances, it will be found desirable to introduce relatively less water through the pipe 27 than through the pipe 45.

If mixing valves are used to disperse the relatively fresh water into the oil, the pressure drops thereacross will be controlled to produce the desired type of dispersion, as outlined above. No fixed values can be given in this connection for, with some oils, the total drop in pressure from the pipe 20 to the interior of the treater can be much larger than with other oils. It can be said, however, that the particle size of the relatively fresh water decreases as the pressure drop across an emulsifying valve increases. Correspondingly, if the relatively fresh water introduced through the pipe 27 is to form the desirable small droplets, the pressure drop across the mixing valve 31 will usually be greater than the pressure drop across the subsequent valve 51. It will be understood that the desired mixing action can be obtained without resorting to adjustable or weight-loaded valves, and suitable orifices or restricted passages can be substituted as forming the mixing or dispersing means. Likewise, the valve 51, or equivalent restriction, may sometimes be eliminated and reliance placed upon turbulence in the pipe 115 or in the distributor 116 to form the desired dispersion. Once the small droplets of relatively fresh water are dispersed in the oil, they will not be materially disturbed by a later and relatively less intense dispersing or mixing action.

It is preferred to mix the oil with the relatively fresh water at superatmospheric pressure, particularly in the system shown in Figure 1. The pumps 21, 26, and 47, as well as the valves 58 or 60, can be used to proportion the oil and water constituents. The pressure exerted by these pumps is preferably sufficient to force the dispersion into the treater and maintain a superatmospheric pressure therein. Pressures in the treater tank 70 between 10 and 50 lbs./sq. in., or above, can be used but, in most instances, a pressure in this tank of about 25 lbs./sq. in. is sufficient.

The temperature of the dispersion entering the electric field is preferably superatmospheric, but the most desirable temperature will vary with different oils. Ordinarily, temperatures from 100° F. up to the boiling point of water at the pressure existing in the tank 70 can be used with success, and some oils are susceptible to treatment at atmospheric temperatures. The heat can be supplied entirely by use of the heat exchanger 53, or the oil and water constituents can be preheated by the use of the heat exchangers 22, 29, or 46.

The preferred mode of operation is to use a process which is continuous throughout, for example, one in which the portions of relatively fresh water are added successively to a stream of oil. However, semi-continuous or batch operations are within the contemplation of the present invention.

In some instances, it is desirable to the process to re-use a portion of the water separating in the electric treater, re-combining this portion with a more pure water before dispersing it into the oil. The relatively fresh water resulting from such a combining step gives improved results on many oils as evidenced by decreased sludging tendencies, lower cuts of the purified oil, and higher process efficiency in general including a greater percentage removal of impurities. While the reasons for these phenomena are not completely understood, it has been discovered that the effluent water contains, as a result of the process, desirable counter-emulsifying agents extracted from the oil, these agents being of the type assisting in the resolution of water-in-oil emulsions.

If such a mode of operation is desired, a portion of the effluent water can be moved through pipe 140 as controlled by valve 141 and delivered through another valve 142 to the pipe 27. The pipe 140 can communicate with the intake of the pump 26 or may be equipped with a separate pump for delivery of the effluent water to the discharge side of the pump 26.

Similarly, if it is desired to blend a portion of the effluent water with the water drawn from the tank 48, a valve 145 in a pipe 146 can be opened to deliver all or a portion of the stream from the pipe 140 to the pipe 45.

The relative settings of valves 27a and 142 or 45a and 145 will control the proportions of relatively fresh and effluent water, and the best ratios can be determined empirically. The resulting combined water should still be relatively fresh as mentioned above so as to be effective in removing impurities from the oil.

When using steam to form the smallest dispersed droplets, the additional and supplementary relatively fresh water may often desirably be a combination of the water from the tanks 25 or 48 and the effluent water from the treater. By blending the effluent water with the water withdrawn from only one of these tanks, it is thus possible to secure a multi-composition system, and it is often desirable in this instance to have the smallest droplets formed by the condensing of steam, with droplets of next-larger average size comprising some of the effluent water while the droplets of largest average size contain less or none of the effluent water.

Even aside from the use of steam in the process, it is often desirable to have the droplets of smaller average size composed in part of effluent water and the droplets of larger average size composed of the water in one of the tanks 25 or 48, usually the latter, though the invention is not in all instances limited to this mode of operation. This appears to lead to improved treatability and excellent operation of the process in general.

Various changes and modifications can be made without departing from the spirit of the invention as defined in the appended claims.

I claim as my invention:

1. A process for removing water-dispersible impurities from a mineral oil of low or negligible water content, which process includes the steps of: adding relatively fresh water to said oil and mixing the added water and the oil in a first mixing step to form an oil-continuous dispersion containing the relatively fresh water in the form of droplets; later adding more relatively fresh water to said dispersion and mixing the later-added water and said dispersion in a second mixing step to disperse the later-added relatively fresh water into the oil-continuous dispersion in the form of droplets in the oil, said mixing steps being controlled in such manner that the droplets of the relatively fresh water later added are of an average size different from the droplets of the relatively fresh water first added to produce an emulsion containing different-sized droplets of the water suspended in the oil; subjecting said emulsion to the action of an electric field of sufficient intensity to coalesce the water to form coalesced masses comprising impurities from the oil; and separating the coalesced masses from the oil.

2. A process for removing saline material from a mineral oil of low or negligible water content, said saline material being dispersed in the oil in the form of small saline particles, which process includes the steps of: first emulsifying into said oil small droplets of relatively fresh water of a size commensurate with the dispersed saline particles; then emulsifying into the oil larger droplets of relatively fresh water to produce an oil-continuous emulsion containing dispersed saline particles along with said small and said larger droplets; subjecting the oil-continuous emulsion to the action of an electric field to coalesce the water and bring the saline material into association therewith; and separating the coalesced water and its associated saline material from the oil.

3. A continuous process for removing water-dispersible impurities from a mineral oil of low or negligible water content, which process includes the steps of: continuously mixing with a stream of said oil a proportioned amount of relatively fresh water to disperse same throughout the oil stream in the form of small droplets to form a stream of oil-continuous dispersion; later continuously adding to the stream of oil-continuous dispersion another proportioned amount of relatively fresh water and mixing this water with the oil-continuous dispersion to disperse this water into the oil of the dispersion in the form of droplets having an average size larger than said small droplets first dispersed into the oil to form a stream of a resulting electrically-treatable oil-continuous dispersion capable of being continuously resolved with the aid of a coalescing electric field into oil and water without the accumulation of such amount of sludge as would interfere with the maintenance of said electric field; and continuously subjecting said stream of said resulting dispersion to the action of such a coalescing electric field to coalesce the water into masses of sufficient size to settle from the oil and collect as a body of water below said electric field.

4. A process for removing water-dispersible impurities from a mineral oil of low or negligible water content, which process includes the steps of: first adding to the oil and mixing therewith in a first mixing step a first portion of relatively fresh water to disperse the relatively fresh water into the oil as droplets of heterogeneous particle size with an intermediate particle size predominating in number; then adding to this dispersion and mixing therewith in a second mixing step a second portion of relatively fresh water to disperse the water thus added into the oil as droplets of heterogeneous particle size with an intermediate particle size predominating in number, the intermediate particle size produced by said first mixing step being smaller than the intermediate particle size produced by said second mixing step and the range of particle size between the smallest droplets produced by the first mixing step and the largest droplets produced by the second mixing step being greater than the range of particle size produced by either of said mixing steps individually; subjecting the resulting oil-continuous dispersion to the action of a coalescing electric field to coalesce the dispersed droplets thereof into masses comprising said impurities and of a size to settle from the oil; and gravitationally separating said masses from the oil.

CLAUDIUS H. M. ROBERTS.